United States Patent
Liu et al.

(10) Patent No.: US 8,566,092 B2
(45) Date of Patent: Oct. 22, 2013

(54) METHOD AND APPARATUS FOR EXTRACTING PROSODIC FEATURE OF SPEECH SIGNAL

(75) Inventors: Kun Liu, Beijing (CN); Weiguo Wu, Beijing (CN)

(73) Assignee: Sony Corporation, Tokyo (JP)

( * ) Notice: Subject to any disclaimer, the term of this patent is extended or adjusted under 35 U.S.C. 154(b) by 505 days.

(21) Appl. No.: 12/857,008

(22) Filed: Aug. 16, 2010

(65) Prior Publication Data

US 2011/0046958 A1 Feb. 24, 2011

(30) Foreign Application Priority Data

Aug. 21, 2009 (CN) .......................... 2009 1 0168513

(51) Int. Cl.
*G10L 17/00* (2013.01)
(52) U.S. Cl.
USPC ........... 704/246; 704/206; 704/211; 704/268; 704/E15.025
(58) Field of Classification Search
USPC ........... 704/205–206, 211, 246, 268, E15.025
See application file for complete search history.

(56) References Cited

U.S. PATENT DOCUMENTS

| | | | | |
|---|---|---|---|---|
| 4,450,531 | A * | 5/1984 | Kenyon et al. | 708/5 |
| 6,014,617 | A * | 1/2000 | Kawahara | 704/207 |
| 6,453,284 | B1 * | 9/2002 | Paschall | 704/208 |
| 7,120,575 | B2 * | 10/2006 | Haase et al. | 704/207 |
| 2003/0045953 | A1 * | 3/2003 | Weare | 700/94 |
| 2004/0002852 | A1 * | 1/2004 | Kim | 704/205 |
| 2004/0236570 | A1 * | 11/2004 | Tato et al. | 704/206 |
| 2005/0071160 | A1 * | 3/2005 | Huang | 704/233 |
| 2005/0171774 | A1 * | 8/2005 | Applebaum et al. | 704/250 |
| 2005/0246165 | A1 * | 11/2005 | Pettinelli et al. | 704/207 |
| 2007/0136062 | A1 * | 6/2007 | Braunschweiler | 704/253 |
| 2007/0288238 | A1 * | 12/2007 | Hetherington et al. | 704/248 |
| 2009/0177474 | A1 * | 7/2009 | Morita et al. | 704/260 |
| 2009/0326942 | A1 * | 12/2009 | Fulop | 704/246 |
| 2010/0082326 | A1 * | 4/2010 | Bangalore et al. | 704/3 |
| 2010/0082336 | A1 * | 4/2010 | Kida et al. | 704/206 |
| 2012/0089396 | A1 * | 4/2012 | Patel et al. | 704/249 |

OTHER PUBLICATIONS

Shriberg et al. "Can Prosody Aid the Automatic Processing of Multi-Party Meetings? Evidence from Predicting Punctuation, Disfluencies, and Overlapping Speech" 2001.*
Liu et al. "A Study on Content-Based Classification and Retrieval of Audio Database" 2001.*
Yin et al. "Combining Cepstral and Prosodic Features in Language Identification" 2006.*
Adami et al. "Prosodic Modeling for Speaker Recognition Based on Sub-Band Energy Temporal Trajectories" 2005.*
Braunschweiler. "Automatic Detection of Prosodic Cues" 2003.*
Tamburini. "Automatic Prosodic Prominence Detection in Speech using Acoustic Features: an Unsupervised System" 2003.*

(Continued)

*Primary Examiner* — Greg Borsetti
(74) *Attorney, Agent, or Firm* — Oblon, Spivak, McClelland, Maier & Neustadt, L.L.P.

(57) ABSTRACT

The present invention discloses a method and an apparatus for extracting a prosodic feature of a speech signal, the method including: dividing the speech signal into speech frames; transforming the speech frames from time domain to frequency domain; and extracting respective prosodic features for different frequency ranges. According to the above technical solution of the present invention, it is possible to effectively extract the prosodic feature which can combine with a traditional acoustics feature without any obstacle.

15 Claims, 7 Drawing Sheets

(56) References Cited

OTHER PUBLICATIONS

Kockmann et al. "Contour Modeling of Prosodic and Acoustic Features for Speaker Recognition" 2008.*
Cabeceran. "Fusing Prosodic and Acoustic Information for Speaker Recognition" 2008.*
Tamburini. "Automatic detection of prosodic prominence in continuous speech" 2002.*
Bagshaw. "Automatic Prosodic Analysis for Computer Aided Pronunciation Teaching" 1994.*
Sluitjer et al. "Acoustic correlates of linguistic stress and accent in Dutch and American English" 1996.*
Kinnunen et al. "Fusion of Spectral Feature Sets for Accurate Speaker Identification" 2004.*
Lan Tian et al., "Study of data-driven hierarchical prosody generation model for Chinese sentence utterance", Control and Decision, vol. 18, No. 6, Nov. 2003, pp. 656-660 (with English abstract).
Li Xiaoqing et al., "The influence of correspondence between accentuation and information structure on discourse comprehension", Acta Psychologica Sinica, vol. 37, No. 1, 2005, pp. 34-40 (with English abstract).
Yang Yufang et al., "Studies on Speech Prosody", Advances in Psychological Science, vol. 14, No. 4, 2006, pp. 546-550 (with English abstract).
Cai Lianhong et al., "Research on computability of Chinese prosody", New century modern phonetics—Symposium on the fifth national modern phonetics academic conference, 2001, pp. 55-59.

* cited by examiner

METHOD AND APPARATUS FOR EXTRACTING PROSODIC FEATURE OF SPEECH SIGNAL

This application claims priority to Chinese Patent Application No. 200910168513.2, filed with the Chinese Patent Office on Aug. 21, 2009 and entitled "METHOD AND APPARATUS FOR EXTRACTING PROSODIC FEATURE OF SPEECH SIGNAL", which is hereby incorporated by reference in its entirety.

FIELD OF THE INVENTION

The present invention relates to the field of speech signal processing, and, more particularly, relates to a method and an apparatus for extracting a prosodic feature of a speech signal. Also, the present invention relates to a method of applying the prosodic feature by combining with a traditional acoustic feature.

BACKGROUND OF THE INVENTION

A prosodic feature, which is also called as "prosodeme feature" or "supra-segmental feature", such as tone, intonation, stress, length, intensity, pitch, locution, accent or the like of a pronouncer, is a feature component in supra-segment. Presently, there are extensive researches on philology and speech synthesis, mainly focused on stress, length and pitch, which are typically described with fundamental frequency and duration.

For example, in "The Influence of Correspondence between Accentuation and Information Structure on Discourse Comprehension" by LI Xiaoqing, et. al., Acta Psychologica Sinica, Issue 1, 2005 and "Studies on Speech Prosody" by YANG Yufang, et. al., Advances in Psychological Science, Volume 14, Issue 4, 2006, a series of researches on Chinese prosodic features are carried out in terms of perception, cognition and corpus. For the perception, prosodic hierarchies and relevant acoustic cues that can be distinguished perceptually are analyzed with experimental psychology and a perception-labeling corpus analysis method, and it is proved in the result that the prosodic boundaries in the discourse that can be distinguished perceptually are clauses, sentences and paragraphs, as well as perceptually relevant acoustic cues; for the cognition, the role of the prosodic feature in discourse comprehension is researched, and the influence of prosody on information integration and pronoun comprehension in the discourse is researched using the experimental psychology method and an electroencephalogram index, thereby to disclose the cognition and neural mechanism of the role; and for the corpus, based on the labeled corpus, regular stress distribution in sentences, and relation between the information structure and the stress in the discourse are researched using a regular statistical method, and rules of determining prosodic phrase boundaries and focuses according to text information are researched using a decision tree method. Therefore, the research proves the influence of the prosodic feature on perceptive level. However, since the research is from the view of philological grammar analysis, it is limited by the researched language, and how to extract the prosodic feature is not described in the research.

Furthermore, in "Study of Data-Driven Hierarchical Prosody Generation Model for Chinese Sentence Utterance" by Tian Lan, et. al., Control and Decision, Volume 18, Issue 6, 2003, with respect to the characteristic of Chinese pronunciation, a large number of fundamental-frequency profile data of natural Chinese sentences is analyzed statistically from the view of fundamental frequency, and by combining with parameters of duration and gain, prosody information in terms of mood, phrase rhythm, tone of prosodic word and stress of Chinese is researched. In this research, various parameters can be trained and labeled in accordance classification of language knowledge. However, it is difficult to well combine the obtained information of rhythm, stress, mood and the like with the current predominant acoustic features in the speech signal processing, such as MFCC (Mel Frequency Cepstral Coefficient), LPCC (Linear Prediction Cepstrum Coefficient), LSF (Line Spectrum Frequency) and so on.

Additionally, in "Study on Calculability of Chinese Prosodic Feature" by Cai Lianhong, et. al., The Proceeding of 5th National Conference on Modern Phonetics, 2001, quantitative representation of fundamental frequency and perception experiment on average value and pitch range of the fundamental frequency are researched, and the result shows the influence that the change of pitch range has on the auditory sense is less significant than the change of the average value has; meanwhile, the fundamental frequency, duration and pitch range are used as basic parameters to evaluate one syllable, and the stress is researched intensively. Although this research has attempted to carry out the study on calculability of prosody, the experiment is still established on the basis of philological analysis, and analyzes the stress using only the fundamental frequency, duration and signal amplitude. Therefore, such stress characterization requires data labeled manually, and neither can it be generated automatically, nor can it be applied by combining with acoustic features such as MFCC, LPCC and LSF.

At present, how the prosodic feature can be characterized and automatically calculated, and can be well combined with the predominant acoustic features, such as MFCC, LPCC, LSF and the like in the speech signal processing, is a challenge in prosody research, and is also a urgent problem required to be solved.

SUMMARY OF THE INVENTION

Summary of the invention will be given below to provide basic understanding of some aspects of the invention. It shall be appreciated that this summary is neither exhaustively descriptive of the invention nor intended to define essential or important parts or the scope of the invention, but is merely for the purpose of presenting some concepts in a simplified form and hereby acts as a preamble of detailed description which will be discussed later.

In view of the above circumstances in the prior art, an object of the invention is to provide a method and an apparatus for extracting a prosodic feature of a speech signal, and a method of applying the prosodic feature by combining with a traditional acoustic feature, which extract respective prosodic features for different frequency ranges from the view of different auditory senses of a person caused by different frequency ranges. The prosodic feature can be generated automatically without manual labeling, and can be applied to various fields of the speech signal processing, such as speaker recognition, speaker clustering and the like, by well combining it with predominant acoustic features in the speech signal processing, such as MFCC, LPCC, LSF or the like.

To achieve the above object, according to an aspect of the invention, there is provided a method for extracting a prosodic feature of a speech signal, including: dividing the speech signal into speech frames; transforming the speech frames from time domain to frequency domain; and calculating respective prosodic features for different frequency ranges.

According to another aspect of the invention, there is further provided an apparatus for extracting a prosodic feature of a speech signal, including: a framing unit for dividing the speech signal into speech frames; a transformation unit for transforming the speech frames from time domain to frequency domain; and a prosodic feature calculation unit for calculating respective prosodic features for different frequency ranges.

According to a further aspect of the invention, there is also provided a method of applying the prosodic feature by combining with a traditional acoustic feature, including: extracting the traditional acoustic feature for each frame; calculating, for the prosodic feature, the feature of a current frame, a difference between the feature of the current frame and the feature of a previous frame, and a difference between the feature of the current frame and an average of respective features in a speech segment of the current frame, respectively; extracting fundamental frequency of each frame, a difference between the fundamental frequency and the fundamental frequency of the previous frame, and a difference between the fundamental frequency and an average of respective fundamental frequencies in a speech segment of the current frame; and combining the above features and applying them to speaker recognition.

According to another aspect of the invention, there is further provided a computer program product for implementing the method for extracting the prosodic feature of the speech signal and/or the method of applying the prosodic feature by combining with the traditional acoustic feature described above.

According to a further aspect of the invention, there is also provided a computer readable medium, on which computer program codes for implementing the method for extracting the prosodic feature of the speech signal and/or the method of applying the prosodic feature by combining with the traditional acoustic feature described above are recorded.

According to the above technical solution of the invention, it is possible to extract the prosodic feature which can combine with the traditional acoustic feature without any obstacle.

BRIEF DESCRIPTION OF THE DRAWINGS

The invention can be better understood with reference to the description given below in conjunction with the accompanying drawings, throughout which identical or like components are denoted by identical or like reference signs, and together with which the following detailed description are incorporated into and form a part of the specification and serve to further illustrate preferred embodiments of the invention and to explain principles and advantages of the invention. In the drawings.

Figure 1:
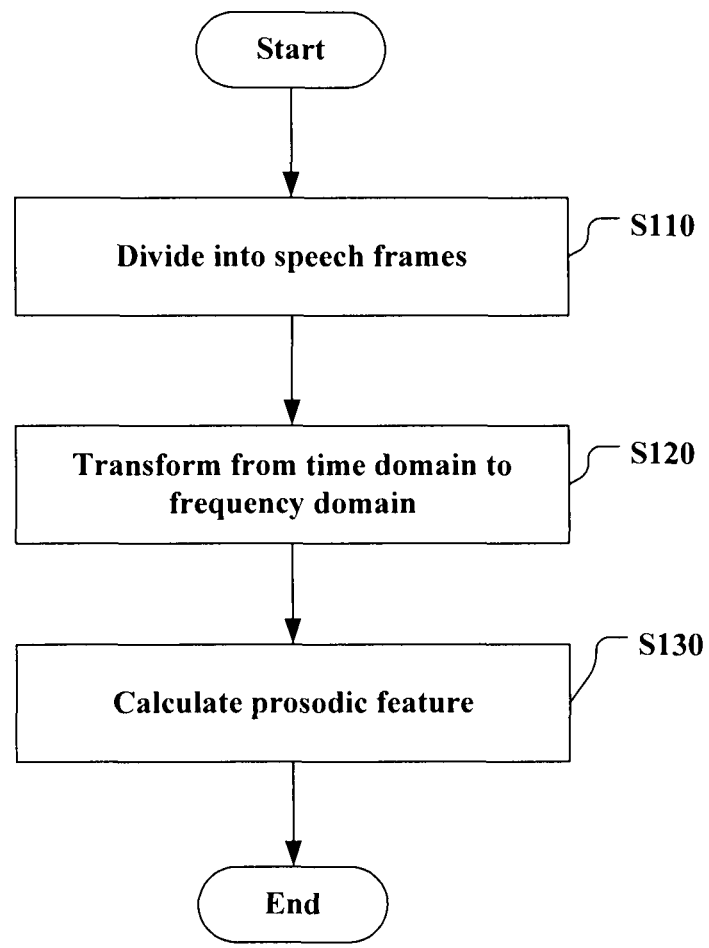
FIG. 1 shows a general flow chart of a method for extracting a prosodic feature of a speech signal according to an embodiment of the invention.

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention.

DETAILED DESCRIPTION OF THE INVENTION

Exemplary embodiments of the present invention will be described in conjunction with the accompanying drawings hereinafter. For the sake of clarity and conciseness, not all the features of actual implementations are described in the specification. However, it is to be appreciated that, during developing any of such actual implementations, numerous implementation-specific decisions must be made to achieve the developer's specific goals, for example, compliance with system-related and business-related constraints which will vary from one implementation to another. Moreover, it is also to be appreciated that, such a development effort might be very complex and time-consuming, but may nevertheless be a routine task for those skilled in the art having the benefit of this disclosure.

It shall further be noted that only device structures and/or processing steps closely relevant to solutions of the invention will be illustrated in the drawings while omitting other details less relevant to the invention so as not to obscure the invention due to those unnecessary details.

First, a method for extracting a prosodic feature of a speech signal according to an embodiment of the invention will be described in detail with reference to the drawings.

FIG. 1 shows a general flow chart of a method for extracting a prosodic feature of a speech signal according to an embodiment of the invention.

As shown in FIG. 1, the prosodic feature extraction method according to the embodiment of the invention includes a framing step S110, a transformation step S120, and a prosodic feature calculation step S130.

First, in the framing step S110, the speech signal is divided into speech frames so as to perform processing in a unit of speech frame in subsequent processing. Herein, preferably, a frame size may be 20 ms, and a frame shift may be 10 ms. Alternatively, it is possible to perform voice segment detection on inputted speech data before framing, and then divide each voice segment into speech frames. Further, preferably, after the framing, it is also possible to perform windowing on the obtained speech frames, so that the windowed speech frames may become processing objects in the subsequent processing.

Next, in the transformation step S120, the speech frames obtained by the framing processing is transformed from time domain to frequency domain. Preferably, transforming the speech frames from time domain to frequency domain can be carried out through Fourier transform.

Finally, in the prosodic feature calculation step S130, respective prosodic features are calculated for different frequency ranges. Preferably, calculating respective prosodic features for different frequency ranges may include one or more of the following processing: calculating, for a first frequency range, such as a low voice band lower than 150 Hz, a thickness feature of the speech signal, wherein the thickness feature is based on frequency domain energy of the first frequency range; calculating, for a second frequency range, such as a low and middle voice band from 150 Hz to 500 Hz, a strength feature of the speech signal, wherein the strength feature is based on time domain energy of the second frequency range; and calculating, for a third frequency range, such as a middle and high voice band from 500 Hz to 5 KHz, a contour feature of the speech signal, wherein the contour feature is based on time domain envelope of the third frequency range.

Figure 2:
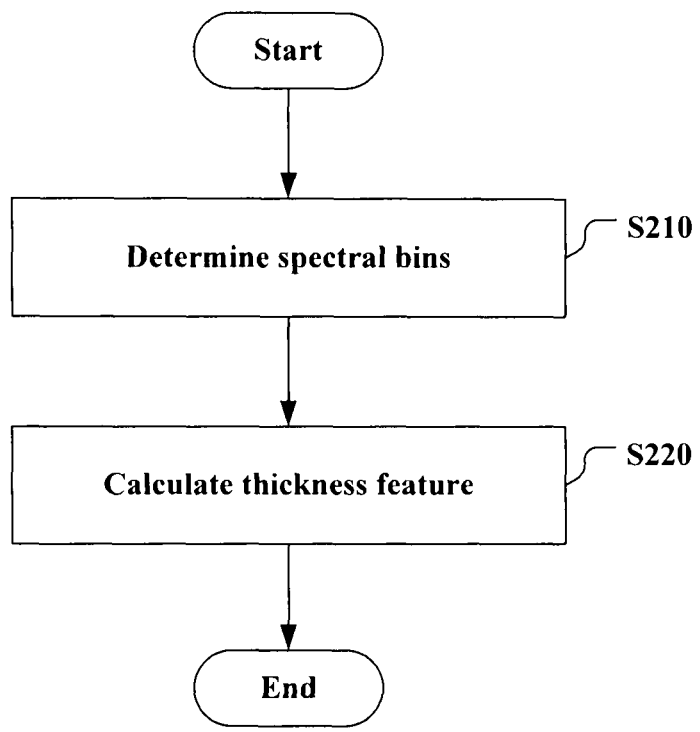
FIG. 2 shows a flow chart of a process of calculating a thickness feature according to a specific embodiment of the invention.

FIG. 2 shows a flow chart of the process of calculating the thickness feature according to a specific embodiment of the invention. The calculation of the thickness feature is performed for the first frequency range.

As shown in FIG. 2, first, in step S210, spectral bins corresponding to the first frequency range are determined for a signal obtained through the transformation from time domain to frequency domain. For example, in the case that the first frequency range is 0-150 Hz, if a signal sampling rate is 16 KHz and a Fourier transform with 512 points is performed, then the number of the corresponding spectral bins is P=150/(8000/256) approximately being equal to 5, and the spectral bins corresponding to the first frequency range are [1, 5].

Next, in step S220, the thickness feature is calculated based on an amplitude spectrum corresponding to each spectral bin in the first frequency range. For example, the thickness feature can be calculated by using the formula $$E = \log_n \frac{1}{P} \sum_p |X(p)|^2,$$

wherein n is a base of a logarithm and may be 2, 4, 10 and so on, P is the number of all the spectral bins in the first frequency range, p is an index of each spectral bin, and $|X(p)|$ is an amplitude spectrum of the spectral bin p. Alternatively, the thickness feature can also be calculated by using the formula $$E = \log_n \frac{1}{P} \sum_p |p^* X(p)|^2.$$

It should be appreciated by those skilled in the art that the above formulas are only exemplary, and the invention is not limited thereto, the thickness feature can be calculated in other manners according to specific designs.

Figure 3:
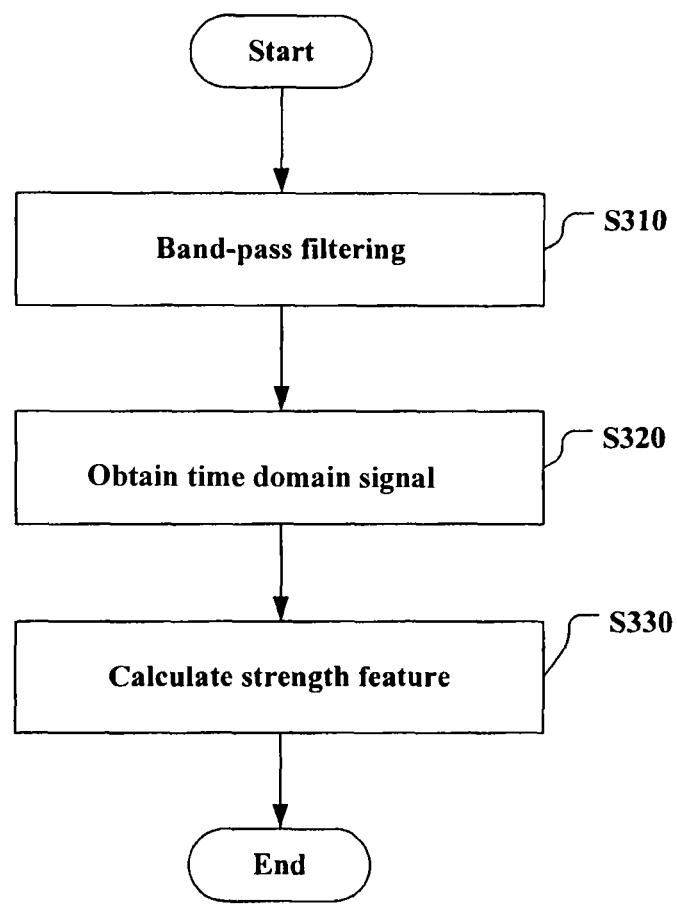
FIG. 3 shows a flow chart of a process of calculating a strength feature according to a specific embodiment of the invention.

FIG. 3 shows a flow chart of the process of calculating the strength feature according to a specific embodiment of the invention. The calculation of the strength feature is performed for the second frequency range.

As shown in FIG. 3, first, in step S310, a signal obtained through the transformation from time domain to frequency domain is passed through a band-pass filter corresponding to the second frequency range, so as to get the frequency spectrum of the second frequency range.

Next, in step S320, a time domain signal of the second frequency range is obtained through inverse filtering.

Finally, in step S330, the strength feature is calculated based on amplitude of each sampling point of the time domain signal obtained through inverse filtering. For example, the strength feature can be calculated by using the formula $$L_{RMS} = K \times \log_n \left( \frac{1}{N} \sum_{i=0}^{N} \hat{A}_i^l \right)^{1/l},$$

wherein K is a predetermined coefficient, n is a base of a logarithm and may be 2, 4, 10 and the like, N is the number of sampling points corresponding to each frame (if the signal sampling rate is 16 K/sec and the frame size is 20 ms, then there are 320 sampling points in each frame), i is an index of each sampling point in a frame, $\hat{A}_i$ is amplitude of the time domain signal obtained through inverse filtering, and 1 is a positive integer and may be 1, 2, 3 and the like. It should be appreciated by those skilled in the art that the above calculation formula is only exemplary, and the invention is not limited thereto, the strength feature can be calculated in other manners according to specific designs.

Figure 4:
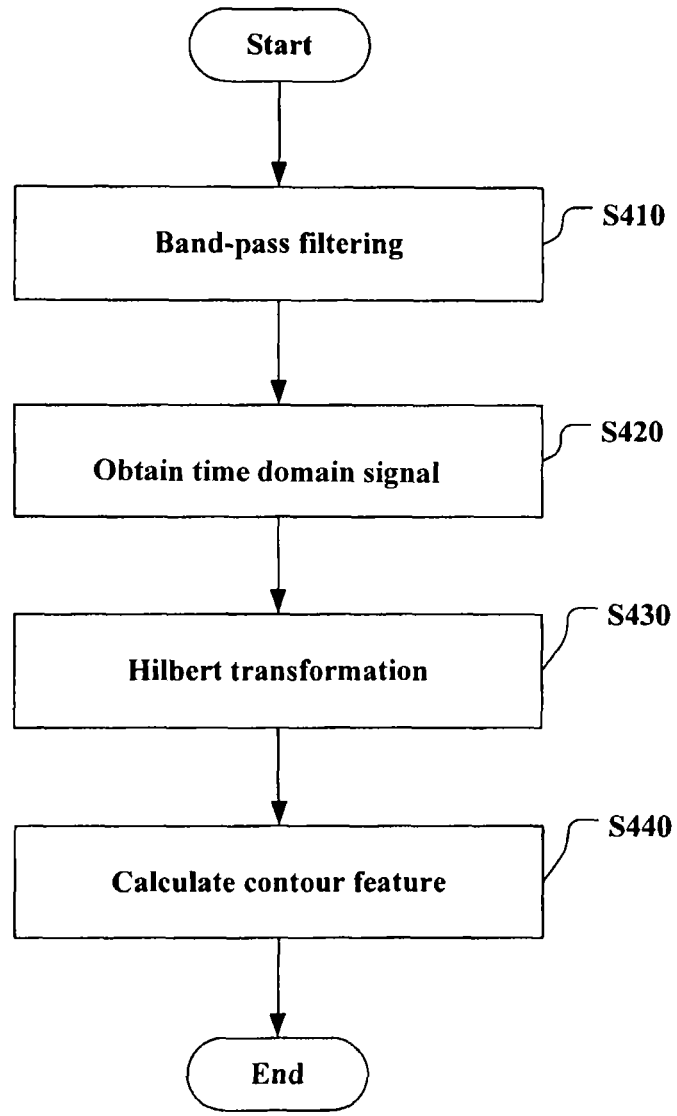
FIG. 4 shows a flow chart of a process of calculating a contour feature according to a specific embodiment of the invention.

FIG. 4 shows a flow chart of the process of calculating the contour feature according to a specific embodiment of the invention. The extraction of the contour feature is performed for the third frequency range.

As shown in FIG. 4, first, in step S410, a signal obtained by the transformation from time domain to frequency domain is passed through a band-pass filter corresponding to the third frequency range, so as to get a frequency spectrum of the third frequency range.

Next, in step S420, a time domain signal of the third frequency range is obtained through inverse filtering.

Next, in step S430, Hilbert transformation is performed on the time domain signal obtained through inverse filtering, so as to get a corresponding Hilbert transformed signal.

Finally, in step S440, the contour feature is calculated based on the time domain signal and the Hilbert transformed signal. For example, the contour feature is obtained by using the formula $a(t)=\sqrt{s_r^2(t)+s_1^2(t)}$, wherein $s_r(t)$ is the time domain signal obtained through inverse filtering, and $s_1(t)$ is the Hilbert transformed signal of $s_r(t)$. It should be appreciated by those skilled in the art that the above calculation formula is only exemplary, and the invention is not limited thereto, the contour feature can be calculated in other manners according to specific designs.

Preferably, the following calculation can be performed after the thickness feature, strength feature and contour feature are extracted according to the foregoing method: calculating variation of each feature, that is, calculating a difference between the feature of a current frame and the feature of a previous frame; and calculating a difference between the feature of the current frame and an average of respective features in a speech segment of the current frame.

Thus, there are three parameters in each prosodic feature, that is, the feature of the current frame, the difference between the feature of the current frame and the feature of the previous frame, and the difference between the feature of the current frame and the average of respective features in the speech segment of the current frame.

The thickness feature, strength feature and contour feature of the invention calculated by the method described above can be applied to various fields in speech signal processing, such as speaker recognition, speaker clustering and the like. In addition, as mentioned previously, these prosodic feature parameters may combine with other acoustic features without any obstacle, so as to overcome the problems about the existing acoustic features as mentioned previously and be more efficiently applied to various fields of the above signal processing.

Figure 5:
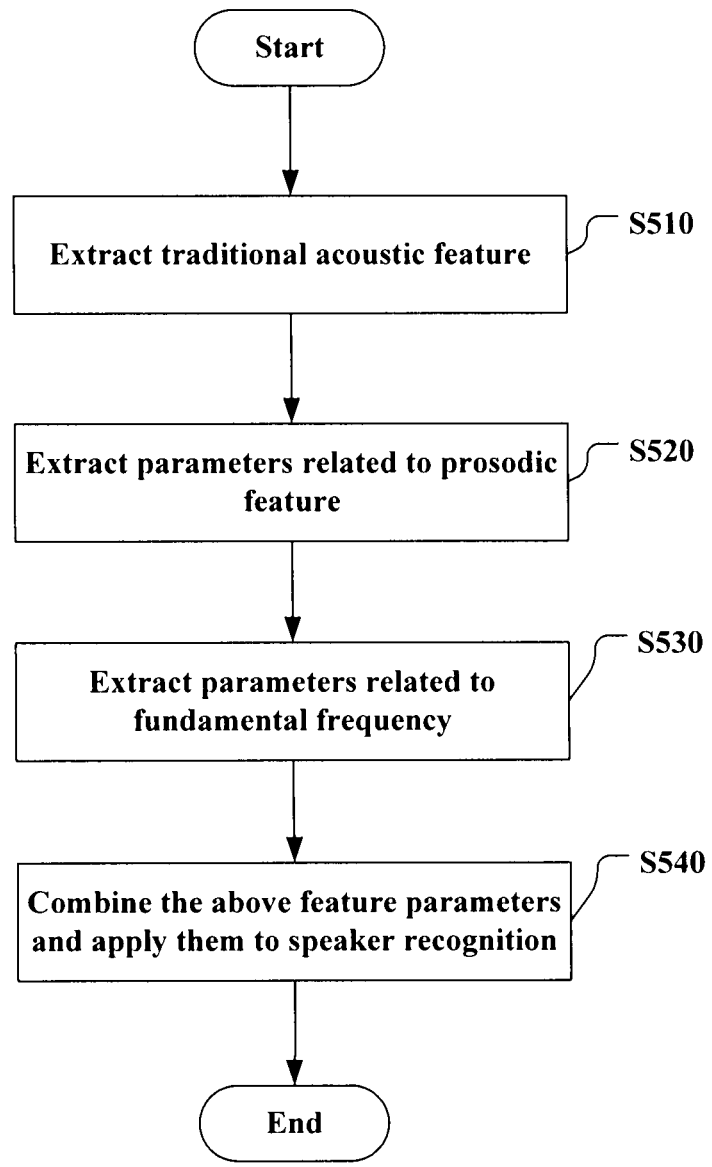
FIG. 5 shows a flow chart of a method of applying the prosodic feature of the invention by combining with a traditional acoustic feature according to an embodiment of the invention.

FIG. 5 shows a method of applying the prosodic feature extracted according to the foregoing method by combining with the traditional acoustic feature according to an embodiment of the invention, including:

In step S510, the traditional acoustic feature, such as MFCC feature, is extracted for each frame, with a dimension of m;

In step S520, for the extracted thickness feature, strength feature and contour feature, the three parameters mentioned previously, that is, the feature of a current frame, the difference between the feature of the current frame and the feature of a previous frame and the difference between the feature of the current frame and an average of respective features in a speech segment of the current frame, are calculated respectively, with 9 parameters in total;

In step S530, fundamental frequency of each frame, a difference between the fundamental frequency and the feature of the previous frame, and a difference between the fundamental frequency and the average of respective features in the speech segment of the current frame are extracted, with 3 features in total; and In step S540, the respective parameters described above (a feature of m+9+3 dimensions) are combined and applied to the speaker recognition. Herein, the thickness feature is the most important compared with other prosodic features.

Preferably, the traditional acoustic feature described above may be one or more of MFCC, LPCC and LSF.

In the following, an apparatus for extracting a prosodic feature of a speech signal according to an embodiment of the invention will be described with reference to the drawings.

Figure 6:
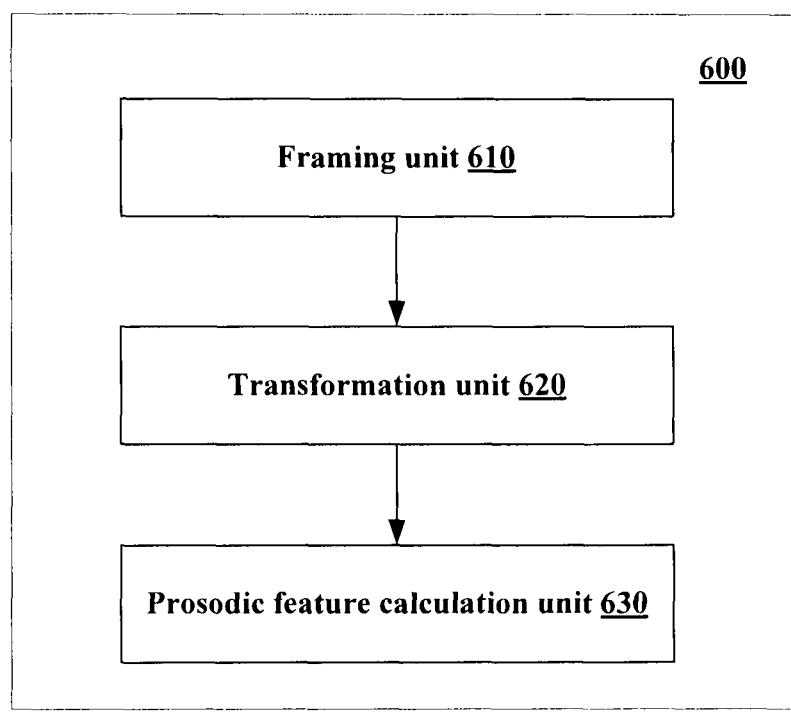
FIG. 6 shows a general block diagram of an apparatus for extracting a prosodic feature of a speech signal according to an embodiment of the invention.

FIG. 6 shows a block diagram of the prosodic feature extraction apparatus 600 according to the embodiment of the invention, in which only the portions closely related to the invention are shown for simplicity. In the prosodic feature extraction apparatus 600, the prosodic feature extraction method described above with reference to FIG. 1 can be performed.

As shown in FIG. 6, the prosodic feature extraction apparatus 600 according to the embodiment of the invention may include a framing unit 610, a transformation unit 620, and a prosodic feature calculation unit 630.

The framing unit 610 may be adapted to divide the speech signal into speech frames. The transformation unit 620 may be adapted to transform the speech frames from time domain to frequency domain. The prosodic feature calculation unit 630 may be adapted to calculate respective prosodic features for different frequency ranges.

According to one embodiment of the invention, the prosodic feature calculation unit 630 may further include one or more of the following units: a thickness feature calculation unit for calculating a thickness feature of a speech signal for a first frequency range, wherein the thickness feature is based on frequency domain energy of the first frequency range; a strength feature calculation unit for calculating a strength feature of the speech signal for a second frequency range, wherein the strength feature is based on time domain energy of the second frequency range; and a contour feature calculation unit for calculating a contour feature of the speech signal for a third frequency range, wherein the contour feature is based on time domain envelope of the third frequency range.

After reading the description about respective processing set forth above, how the function of each component constituting the prosodic feature extraction apparatus 600 can be achieved will become quite clear, and thus the description thereof is omitted here.

It should be illustrated that the structure of the prosodic feature extraction apparatus 600 shown in FIG. 6 is only exemplary, and those skilled in the art may make modification to the structural block diagram as shown in FIG. 6 as necessary.

In the following, the validity of the prosodic features proposed in the invention and their efficient combination with the traditional acoustic feature are proved through the experiment data.

In the experiment data of the following first, second and third experiment: there are 2 male voices and 2 female voices, and the language is Putonghua.

The first experiment: the influence on speaker recognition rate with training data of different lengths when using the prosodic feature alone is tested.

TABLE 1 the influence of the variation of training data length on the recognition rate.

| | Fundamental frequency | Thickness | strength | contour | combining the 4 features |
|---|---|---|---|---|---|
| 15 secs | 39.3% | 56% | 29.8% | 33.8% | 60.1% |
| 30 secs | 41.8% | 58% | 33% | 35.7% | 73% |
| 60 secs | 39.4% | 61.8% | 32.8% | 36.9% | 79.8% |
| 90 secs | 52.5% | 77.2% | 43.3% | 46% | 82.2% |

The second experiment: the influence on speaker recognition rate with training data of the same length (30 seconds) when using the prosodic feature alone is tested.

TABLE 2 the influence on the recognition rate with training data of the same length when using the prosodic feature alone.

| | recognition rate with test data within training data set | recognition rate with test data out of training data set |
|---|---|---|
| Fundamental frequency | 49.5% | 41.8% |
| thickness | 60.9% | 58% |
| strength | 37.9% | 33% |
| contour | 39% | 35.7% |

The third experiment: the influence on speaker recognition rate with training data of the same length (30 seconds) when using these prosodic features in combination and using these prosodic features and the fundamental frequency in combination is tested.

TABLE 3 the influence on the recognition rate with training data of the same length when using the prosodic features in combination.

| | recognition rate with data within training data set | recognition rate with data out of training data set |
|---|---|---|
| thickness + strength + contour | 65.8% | 73.1% |
| fundamental frequency + thickness + strength + contour | 74.4% | 73% |

In the experiment data of the following fourth, fifth and sixth experiment: there are 5 male voices and 5 female voices, and the language is Putonghua.

The fourth experiment: the influence on the speaker recognition rate with the training data of the same length (30 seconds) when using three kinds of traditional acoustic features alone is tested.

| feature | recognition rate with test data within training data set | recognition rate with test data 1 out of training data set | recognition rate with test data 2 out of training data set | recognition rate with test data 3 out of training data set |
| --- | --- | --- | --- | --- |
| MFCC54D | 78.49% | 66.63% | 68.49% | 68.60% |
| LPCC14 | 55.39% | 46.96% | 47.03% | 47.07% |
| LSF14 | 53.86% | 45.82% | 46.73% | 46.06% |

Herein, MFCC54D means 18-dim MFCC+difference of the first order+difference of the second order, and it can be seen that the performance of the MFCC feature is better than that of LPCC and LSF.

The fifth experiment: the influence on speaker recognition rate with training data of 30 seconds (the same test data) when using the fundamental frequency and the three new prosodic features in combination is tested.

| feature | recognition rate with test data within training data set | recognition rate with test data 1 out of training data set | recognition rate with test data 2 out of training data set | recognition rate with test data 3 out of training data set |
| --- | --- | --- | --- | --- |
| prosody | 72.72% | 56.05% | 59.77% | 55.72% |

The prosody is a parameter of the overall feature obtained by combining the fundamental frequency with the three new prosodic features.

The sixth experiment: the effect with training data of 30 seconds (the same test data) when combining the prosodic features with other traditional acoustic features is tested.

| Feature | recognition rate with test data within training data set | recognition rate with test data 1 out of training data set | recognition rate with test data 2 out of training data set | recognition rate with test data 3 out of training data set |
| --- | --- | --- | --- | --- |
| MFCC54D | 78.49% | 66.63% | 68.49% | 68.60% |
| MFCC54D_Prosody | 91.49% | 73.68% | 76.02% | 76.70% |
| LPCC_Prosody | 85.00% | 67.12% | 70.61% | 69.73% |
| LSF_Prosody | 85.26% | 66.68% | 69.34% | 68.47% |

It can be known from the above experiment data that the performance of the thickness feature is the best when the prosodic feature of the invention is used alone; and after applying the prosodic feature by combining with other traditional acoustic features, the effect of speaker recognition is improved significantly (absolutely 6%-9%), so as to well make up the disadvantages of the traditional acoustic features in characterizing the characteristic of the speaker's voice.

While the basic principle of the present invention is described above in conjunction with specific embodiments, it should be noted that, it will be understood for those ordinarily skilled in the art that all or any steps or components of the method and device of the present invention can be implemented with hardware, firmware, software or combination thereof in any computing device (including a processor and a storage medium, etc.) or a network of computing devices, which can be implemented by those ordinarily skilled in the art by using their basic programming skill after reading the description of the present invention.

Therefore, based on the understanding described above, the object of the present invention can also be achieved by running a program or a set of programs on any information processing device. The information processing device may be a well-known universal device. Therefore, the object of the present invention can also be achieved by providing a program product containing program codes implementing the method or device. That is, such program product also constitutes the present invention, and a storage medium storing such program product also constitutes the present invention. Obviously, the storage medium may be any well-known storage medium or any storage medium to be developed in the future.

Figure 7:
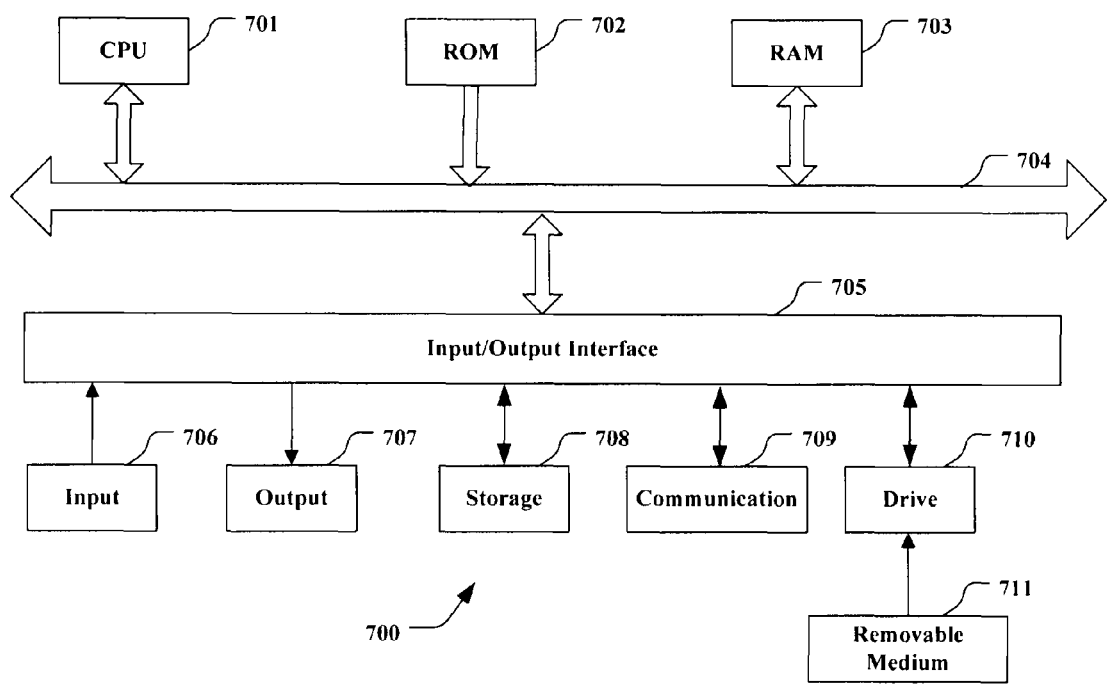
FIG. 7 shows a block diagram of an exemplary structure of an information processing device in which the method and/or apparatus for extracting the prosodic feature of the speech signal according to embodiments of the invention can be implemented.

In the case where the above embodiments are implemented by software and/or firmware, a program that constitutes the software is installed, from a storage medium or a network, into a computer having a dedicated hardware configuration, e.g., a general-purpose personal computer 700 as illustrated in FIG. 7, that when various programs are installed therein, becomes capable of performing various functions, or the like.

In FIG. 7, a central processing unit (CPU) 701 performs various processes in accordance with a program stored in a read only memory (ROM) 702 or a program loaded from a storage section 708 to a random access memory (RAM) 703. In the RAM 703, data required when the CPU 701 performs the various processes or the like is also stored as required. The CPU 701, the ROM 702 and the RAM 703 are connected to one another via a bus 704. An input/output interface 705 is also connected to the bus 704.

The following components are connected to input/output interface 705: An input section 706 including a keyboard, a mouse, or the like; An output section 707 including a display such as a cathode ray tube (CRT), a liquid crystal display (LCD), or the like, and a loudspeaker or the like; The storage section 708 including a hard disk or the like; and a communication section 709 including a network interface card such as a LAN card, a modem, or the like. The communication section 709 performs a communication process via the network such as the internet.

A drive 710 is also connected to the input/output interface 705 as required. A removable medium 711, such as a magnetic disk, an optical disk, a magneto-optical disk, a semiconductor memory, or the like, is mounted on the drive 710 as required, so that a computer program read therefrom is installed into the storage section 708 as required.

In the case where the above-described series of processes are implemented by the software, the program that constitutes the software is installed from the network such as the internet or the storage medium such as the removable medium 711.

One skilled in the art should note that, this storage medium is not limit to the removable medium 711 having the program stored therein as illustrated in FIG. 7, which is delivered separately from the device for providing the program to the user. Examples of the removable medium 711 include the magnetic disk (including a floppy disk (register trademark)), the optical disk (including a compact disk-read only memory (CD-ROM) and a digital versatile disk (DVD)), the magneto-optical disk (including a mini-disk (MD) (register trademark)), and the semiconductor memory. Alternatively, the storage medium may be the ROM 702, the hard disk contained in the storage section 708, or the like, which have the program stored therein and is delivered to the user together with the device that containing them.

It should also be noted that, obviously, in the apparatus and method of the present invention, respective components or steps can be decomposed and/or recombined. These decomposition and/or recombination should be regarded as equivalent solutions. Further, the step in which the above-described series of processes are performed may naturally be performed chronologically in order of description but needed not be performed chronologically. Some steps may be performed in parallel or independently of one another.

Although illustrative embodiments have been described herein, it should be understood that various other changes, replacements and modifications may be affected therein by one skilled in the art without departing from the scope or spirit of the invention. Furthermore, the terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

What is claimed is:

1. A method for extracting a prosodic feature of a speech signal, comprising:
   dividing the speech signal into speech frames;
   transforming the speech frames from time domain to frequency domain;
   calculating respective prosodic features for different frequency ranges;
   extracting a traditional acoustics feature for each speech frame;
   calculating, for each said prosodic feature, a feature associated with a current frame, a difference between the feature associated with the current frame and a feature associated with a previous frame, and a difference between the feature associated with the current frame and an average of respective features in a speech segment of the current frame;
   extracting a fundamental frequency of the current frame, a difference between the fundamental frequency of the current frame and a fundamental frequency of the previous frame, and a difference between the fundamental frequency of the current frame and an average of respective fundamental frequencies in the speech segment of the current frame; and
   recognizing speech associated with the speech signal based on said calculating for each said prosodic feature and said extracting the fundamental frequency,
   wherein said calculating the respective prosodic features for different frequency ranges includes one or more of the following:
   calculating a thickness feature of the speech signal for a first frequency range, wherein the thickness feature is based on frequency domain energy of the first frequency range;
   calculating a strength feature of the speech signal for a second frequency range, wherein the strength feature is based on time domain energy of the second frequency range; and
   calculating a contour feature of the speech signal for a third frequency range, wherein the contour feature is based on a time domain envelope of the third frequency range.

2. The method according to claim 1, wherein said calculating the thickness feature of the speech signal for the first frequency range includes calculating the thickness feature based on amplitude spectrums corresponding to all spectral bins in the first frequency range.

3. The method according to claim 1, wherein said calculating the strength feature of the speech signal for the second frequency range includes:
   obtaining a time domain signal through inverse filtering for the second frequency range; and
   calculating the strength feature based on amplitudes of each sampling point of the time domain signal obtained through inverse filtering.

4. The method according to claim 1, wherein said calculating the contour feature of the speech signal for the third frequency range includes:
   obtaining a time domain signal through inverse filtering for the third frequency range;
   performing Hilbert transformation on the time domain signal obtained through inverse filtering to obtain a corresponding Hilbert transformed signal; and
   calculating the contour feature based on the time domain signal and the Hilbert transformed signal.

5. The method according to claim 1, wherein the first frequency range is a frequency range of 0-150 Hz, the second frequency range is a frequency range of 150-500 Hz, and the third frequency range is a frequency range of 500 Hz-5 KHz.

6. The method according to claim 1, wherein said transforming the speech frames from time domain to frequency domain is carried out through Fourier transform.

7. The method according to claim 1, wherein said calculating the respective prosodic features for different frequency ranges is performed based on each frame.

8. The method according to claim 1, wherein the traditional acoustics feature includes one or more of MFCC (Mel Frequency Cepstrum Coefficient), LPCC (Linear Prediction Cepstrum Coefficient) and LSF (Line Spectrum Frequency).

9. An apparatus for extracting a prosodic feature of a speech signal, comprising:
   a hardware processor including:
   a framing unit adapted to divide the speech signal into speech frames;
   a transformation unit adapted to transform the speech frames from time domain to frequency domain;
   a prosodic feature calculation unit adapted to calculate respective prosodic features for different frequency ranges;
   a first extracting unit adapted to extract a traditional acoustics feature for each speech frame;
   a calculating unit adapted to calculate, for each said prosodic feature, a feature associated with a current frame, a difference between the feature associated with the current frame and a feature associated with a previous frame, and a difference between the feature associated with the current frame and an average of respective features in a speech segment of the current frame;

a second extracting unit adapted to extract a fundamental frequency of the current frame, a difference between the fundamental frequency of the current frame and a fundamental frequency of the previous frame, and a difference between the fundamental frequency of the current frame and an average of respective fundamental frequencies in the speech segment of the current frame; and a recognizing unit adapted to recognize speech associated with the speech signal based on the calculating of said calculating unit and the extracting of said second extracting unit, wherein the prosodic feature calculation unit includes one or more of the following units:

a thickness feature calculation unit adapted to calculate a thickness feature of the speech signal for a first frequency range, wherein the thickness feature is based on frequency domain energy of the first frequency range;

a strength feature calculation unit adapted to calculate a strength feature of the speech signal for a second frequency range, wherein the strength feature is based on time domain energy of the second frequency range; and a contour feature calculation unit adapted to calculate a contour feature of the speech signal for a third frequency range, wherein the contour feature is based on a time domain envelope of the third frequency range.

10. The apparatus according to claim 9, wherein the thickness feature calculation unit calculates the thickness feature based on amplitude spectrums corresponding to all spectral bins in the first frequency range.

11. The apparatus according to claim 9, wherein the strength feature calculation unit obtains a time domain signal through inverse filtering for the second frequency range, and calculates the strength feature based on amplitudes of each sampling point of the time domain signal obtained through inverse filtering.

12. The apparatus according to claim 9, wherein the contour feature calculation unit obtains a time domain signal through inverse filtering for the third frequency range, performs Hilbert transformation on the time domain signal to obtain a corresponding Hilbert transformed signal, and calculates the contour feature based on the time domain signal and the Hilbert transformed signal.

13. The apparatus according to claim 9, wherein the first frequency range is a frequency range of 0-150 Hz, the second frequency range is a frequency range of 150-500 Hz, and the third frequency range is a frequency range of 500 Hz-5 KHz.

14. The apparatus according to claim 9, wherein the transformation unit transforms the speech frames from time domain to frequency domain through Fourier transform.

15. The apparatus according to claim 9, wherein the prosodic feature calculation unit calculates the prosodic features based on each frame.

* * * * *